United States Patent
Richard et al.

(10) Patent No.: US 6,745,675 B2
(45) Date of Patent: Jun. 8, 2004

(54) DEVICE FOR PRESERVATION AND RETHERMALIZATION OF MEAL TRAYS

(75) Inventors: Philippe Richard, Doussard (FR); Emmanuel Excoffon, Cons Sainte Colombe (FR)

(73) Assignee: Societe Cooperative de Production Bourgeois (FR)

( * ) Notice: Subject to any disclaimer, the term of this patent is extended or adjusted under 35 U.S.C. 154(b) by 15 days.

(21) Appl. No.: 10/415,684

(22) PCT Filed: Nov. 6, 2001

(86) PCT No.: PCT/FR01/03414
§ 371 (c)(1),
(2), (4) Date: May 1, 2003

(87) PCT Pub. No.: WO02/38018
PCT Pub. Date: May 16, 2002

(65) Prior Publication Data
US 2004/0011220 A1 Jan. 22, 2004

(30) Foreign Application Priority Data
Nov. 7, 2000 (FR) .............................. 00 14511

(51) Int. Cl.[7] .......................... A47J 39/00; H05B 3/68; A47B 3/02; A47G 23/06; F25B 29/00
(52) U.S. Cl. .............................. 99/470; 99/448; 99/483; 165/48.1; 165/918; 219/386; 219/400
(58) Field of Search .......................... 99/326–331, 339, 99/340, 448, 357, 483, 467–470, 473–476; 219/386, 387, 400, 402, 502, 385, 521, 523, 409–411, 620, 622; 165/918, 919, 206, 12, 11.1, 48.1, 64; 62/3.2, 3.3, 3.62; 312/236; 392/449, 459; 426/237, 243, 302, 466, 523, 390, 244

(56) References Cited

U.S. PATENT DOCUMENTS

| 4,386,703 | A | * | 6/1983 | Thompson et al. | 206/557 |
|---|---|---|---|---|---|
| 5,086,834 | A | * | 2/1992 | Grandi | 165/135 |
| 5,159,973 | A | | 11/1992 | Pennington et al. | |
| 5,182,438 | A | * | 1/1993 | Oakes et al. | 219/386 |
| 5,245,150 | A | * | 9/1993 | Grandi | 219/753 |
| 5,273,360 | A | * | 12/1993 | Wyatt et al. | 374/141 |
| 5,281,426 | A | * | 1/1994 | Pardo | 426/232 |
| 5,285,051 | A | * | 2/1994 | DeGrow et al. | 219/386 |
| 5,403,997 | A | * | 4/1995 | Wimpee et al. | 219/386 |
| 5,424,427 | A | * | 6/1995 | Arnost | 544/198 |
| 5,466,915 | A | * | 11/1995 | Meier et al. | 219/622 |
| 5,505,122 | A | * | 4/1996 | Gerrit | 99/476 |
| 5,603,858 | A | * | 2/1997 | Wyatt et al. | 219/620 |
| 5,628,241 | A | * | 5/1997 | Chavanaz et al. | 99/331 |
| 6,120,819 | A | | 9/2000 | Violi et al. | |

\* cited by examiner

Primary Examiner—Timothy F. Simone
(74) Attorney, Agent, or Firm—RatnerPrestia

(57) ABSTRACT

The invention concerns a device comprising, in an insulating chamber, an internal space for receiving a tray divided into a rear compartment for rethermalization and a front compartment for preserving cold, which communicate with each other through an intermediate passage, and which are accessible through a front passage. A front closing flap and an intermediate closing flap are rigidly coupled to each other via longitudinal lateral arms, and are displaced by tilting between a closed position to close the front passage and the intermediate passage respectively and an open position for passing a meal tray from the front to the rear. The closing flaps contribute to the thermal insulation, and enable efficient rethermalization to obtain core-heated food items in the rear compartment and food items preserved cold in the front compartment.

10 Claims, 6 Drawing Sheets

DEVICE FOR PRESERVATION AND RETHERMALIZATION OF MEAL TRAYS

This application is the U.S. national phase application of PCT International Application No. PCT/FR01/03414 filed Nov. 6, 2001.

TECHNICAL FIELD OF THE INVENTION

The present invention relates to the institutional distribution of meals, for example in hospitals or other similar institutions, enabling foods placed on a meal tray to be stored and heated.

Institutional distribution of meals frequently uses meal trays on which foods are placed so that they are directly accessible to the person eating the meal without necessitating additional manipulations. The meal trays usually have a first tray portion carrying foods intended to be eaten cold, and a second tray portion carrying foods intended to be eaten hot. The meal trays are prepared in an institutional kitchen, then they are collectively transported in an insulated or refrigerated trolley that usually contains from 10 to 40 meal trays.

The above kind of trolley is described in U.S. Pat. No. 5,159,973, for example. The foods intended to be eaten cold are kept cold by an integral cooling device that operates on one half of each meal tray. The foods intended to be eaten hot are on the other half of each meal tray, which is insulated from the first half by a fixed partition. At meal times, personnel must remove the meal trays from the trolley and distribute them to the persons eating the meals.

One problem is complying with hygiene conditions, and especially temperature conditions, both for storing the foods and for heating them to the correct temperature. After heating, the foods intended to be eaten hot must be at a core temperature in the region of 65° C., whereas the foods intended to be eaten cold must be at a core temperature of around 8° C. But all of those foods are placed on the same meal tray, and it is clear that an exchange of heat tends to take place between the tray portion carrying the hot foods and the tray portion carrying the cold foods.

The above prior art devices do not comply with these hygiene conditions, and this encourages the growth of bacteria and the propagation of certain illnesses.

To improve the storage and heating of foods placed on a meal tray, enabling the foods to be kept cold until it is time to heat them, and to ensure correct heating, so that the foods are at a standardized temperature when the meals are eaten, a device for storing and heating foods placed on a meal tray has already been developed (see U.S. Pat. No. 6,120,819), the device comprising:

- an insulated enclosure having an interior space for receiving a tray accessible via a front passage and divided into a rear compartment and a front compartment that communicate with each other via an intermediate passage,
- a cooling device adapted to maintain an appropriate storage temperature in the interior space in the insulated enclosure for receiving a tray,
- a heating device, adapted to generate a heat energy in a heating space in the front compartment or the rear compartment,
- a front closure flap and an intermediate closure flap, that are mechanically coupled together using articulated arms to move vertically between (i) a closed position in which the front closure flap closes the front passage and the intermediate closure flap closes the intermediate passage above the meal tray to provide thermal insulation, and (ii) an open position in which the front closure flap and intermediate closure flap are retracted to allow the meal tray and the foods on it to move back and forth.

This kind of structure provides some thermal insulation between the portion containing the heated foods and the portion containing the cold foods, and in theory allows simultaneous manipulation of the thermal insulation flaps since the front flap is directly accessible to the user.

It has become apparent that the structure with two flaps described briefly in U.S. Pat. No. 6,120,819 is unsatisfactory: the vertical sliding movement of the two flaps requires sealed vertical lateral guide slideways and articulated connections to the connecting arms. These components complicate the fabrication of the device and increase its cost, necessitate special precautions to ensure a satisfactory seal, and most importantly constitute an assembly that is too complex to be easily cleaned and thereby comply with foodstuffs standards. The prior art document is silent on these problems and how they are possibly solved.

SUMMARY OF THE INVENTION

The problem addressed by the invention is that of designing a new thermal insulation structure between the hot and cold compartments that is, at the same time, simple, efficient and of low cost, and in particular allows easier cleaning in compliance with foodstuffs standards and hygiene conditions.

Another object of the invention is to design a device of the above kind that is particularly simple to manipulate, so it can be used by persons with reduced mobility, such as bedridden hospital patients.

To achieve the above and other objects, in a structure according to U.S. Pat. No. 6,120,819, the invention provides that the front closure flap and the intermediate closure flap are rigidly connected together by two longitudinal lateral arms that are mounted in the interior space for receiving a tray on two colinear transverse pivots, the two flaps and the two arms together forming a rigid assembly that tilts between an open position and a closed position. The device is simpler, in particular because the flaps no longer slide vertically in guide slideways, guidance being provided exclusively by the pivots.

The seal at the perimeter of the intermediate closure flap can be improved by providing simple elastic tongues, for example elastomer tongues, that bear and slide on a conformed contact surface. For example, the lateral edges of the flap are arcuate and centered on the rotation axis, and curved tongues fastened to the frame bear frontally on said lateral edges of the flap. The transverse edges of the flap are straight, and straight transverse tongues fastened to the frame bear frontally on said transverse edges of the flap.

It is advantageous to make the tilting rigid assembly easily demountable for cleaning by exploiting the elasticity of the tongues providing the seal. To this end, the pivots can be fixed horizontal pegs that engage vertically and removably in vertical notches in the bottom edges of the connecting arms. Alternatively, horizontal pegs can be provided on the connecting arms and removably engaged in vertical notches fixed with respect to the frame.

The heating space is preferably in the rear compartment, so that, the user can take hold of the cool area of the tray.

In one advantageous embodiment, the heating space is between a rear portion of the meal tray and a cloche that is placed over it to close said heating space. This improves the thermal insulation between the hot and cold food portions.

The device can advantageously include electrical power supply means adapted to supply electrical power to one or more electrical heating elements in the heating space.

The electrical heating element(s) are preferably incorporated into the wall of the cloche. This further improves the thermal insulation between the hot portion and the cold portion, preventing direct heat exchange via the body of the tray itself.

In one advantageous embodiment, the cloche is removable and is carried by the meal tray.

The device preferably further includes a complementary interior space, which is below the interior space for receiving the tray, accessible from an open front side, and cooled by the cooling device, and a front door for selectively closing off said open front side and the front passage in front of the front closure flap. A device of this kind can therefore serve simultaneously as a bedside table, a device for heating and storing foods on meal trays, and a refrigerator.

BRIEF DESCRIPTION OF THE DRAWINGS

Other objects, features and advantages of the present invention will emerge from the following description of particular embodiments, which is given with reference to the accompanying drawings, in which.

DESCRIPTION OF THE PREFERRED EMBODIMENTS

Figure 1:
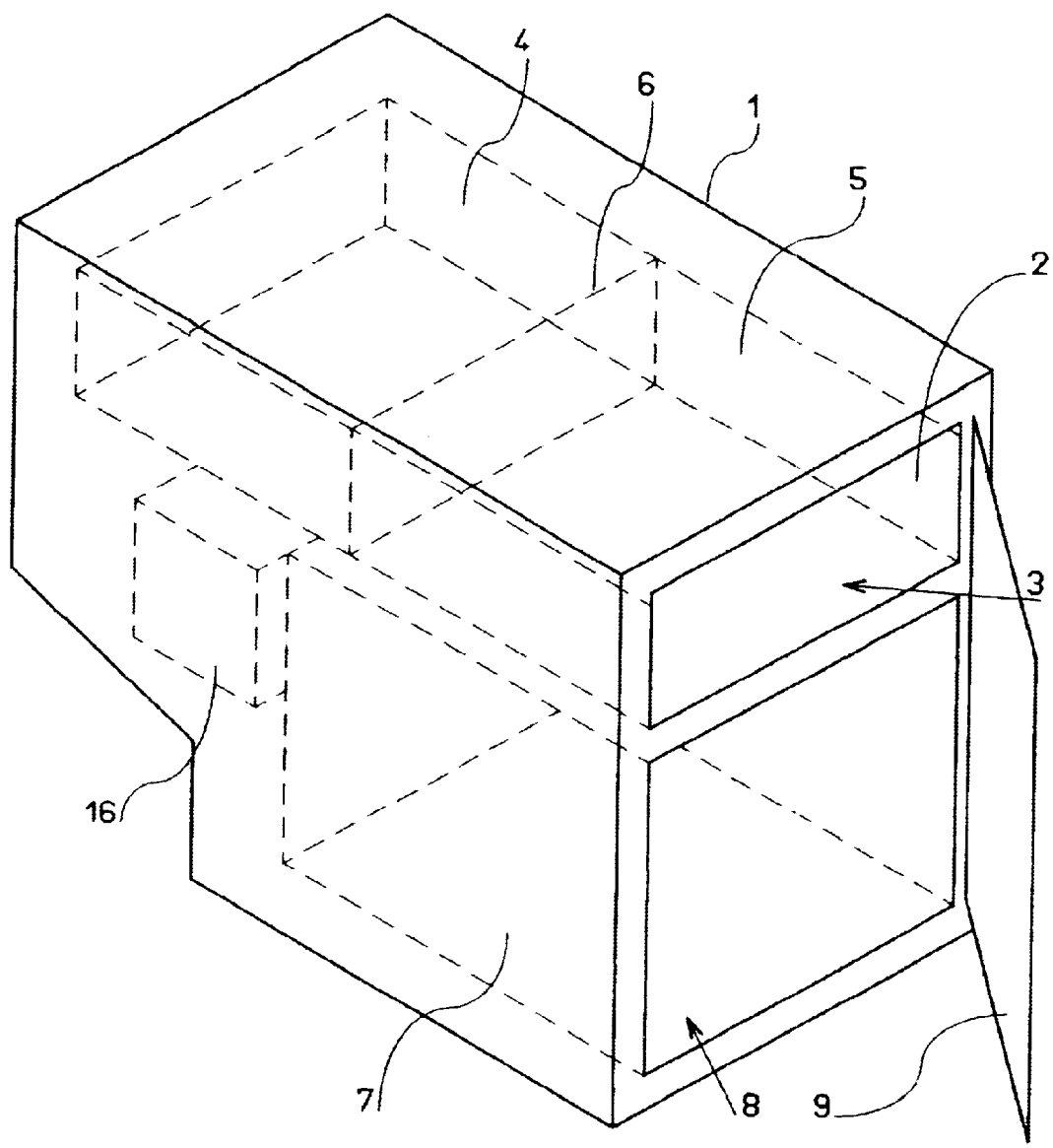
FIG. 1 is a diagrammatic perspective view of one embodiment of a device according to the present invention.

The embodiment of a device according to the invention shown in FIG. 1 includes an insulated enclosure 1 having an interior space 2 for receiving a tray that is accessible via a front passage 3 and is divided into a rear compartment 4 and a front compartment 5 that communicate with each other via an intermediate passage 6. A complementary interior space 7 under the interior space 2 for receiving a tray is accessible via an open front side 8. A front door 9 selectively closes the open front side 8 and the front passage 3.

Refer now to FIGS. 2 to 5, which show the interior compartments more clearly, the peripheral walls of the insulated enclosure 1 having been removed.

These figures therefore show the interior space 2 for receiving a tray, the front passage 3, the rear compartment 4, the front compartment 5, the intermediate passage 6.

Figure 2:
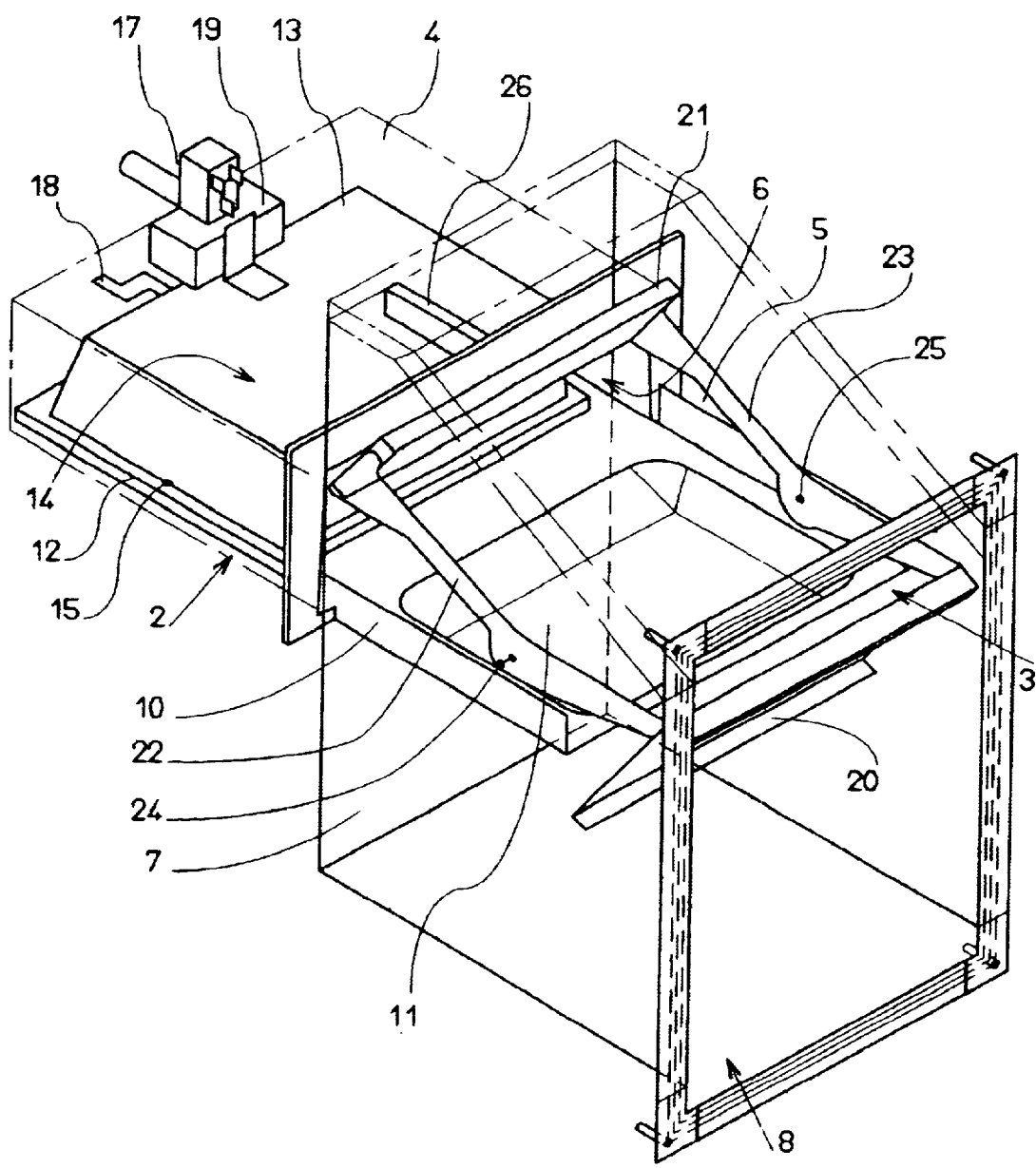
FIG. 2 is a perspective view showing interior portions of the FIG. 1 device relating to means for storing and heating foods, with a meal tray in position and the flaps open.

These figures show, most completely in FIG. 2, a meal tray 10, which has a front portion 11 intended to carry foods to be eaten cold, and a rear portion 12 intended to carry foods to be eaten hot. The rear portion 12 is closed by a cloche 13 which defines a heating space 14. Thus, the heating space 14 consists of the volume between the rear portion 12 of the meal tray 10 and the cloche 13 placed on top of it. The heating space 14 is closed, except for two small lateral openings such as the opening 15, provided in the two opposite lateral sides of the cloche 13.

In the embodiment shown, which is the usual arrangement, the meal tray 10 is divided into a front portion 11 and a rear portion 12 of substantially the same size.

A cooling device 16 (see FIG. 1) is adapted to maintain an appropriate storage temperature in the interior space 2 for receiving a tray, which comprises the rear compartment 4 and the front compartment 5, and the complementary interior space 7.

A heating device 17, in the rear compartment 4, is adapted to generate a heat energy in the heating space 14.

In the embodiment shown in the figures, the heating device 17 includes an electrical power supply circuit, with electrical conductors 18 connected to terminals inside a box 19. The terminals contact two corresponding conductive tracks on the upper surface of the cloche 13. The conductive tracks are connected to one or more electrical heating elements in the top wall of the cloche 13 and adapted to heat the heating space 14.

Figure 3:
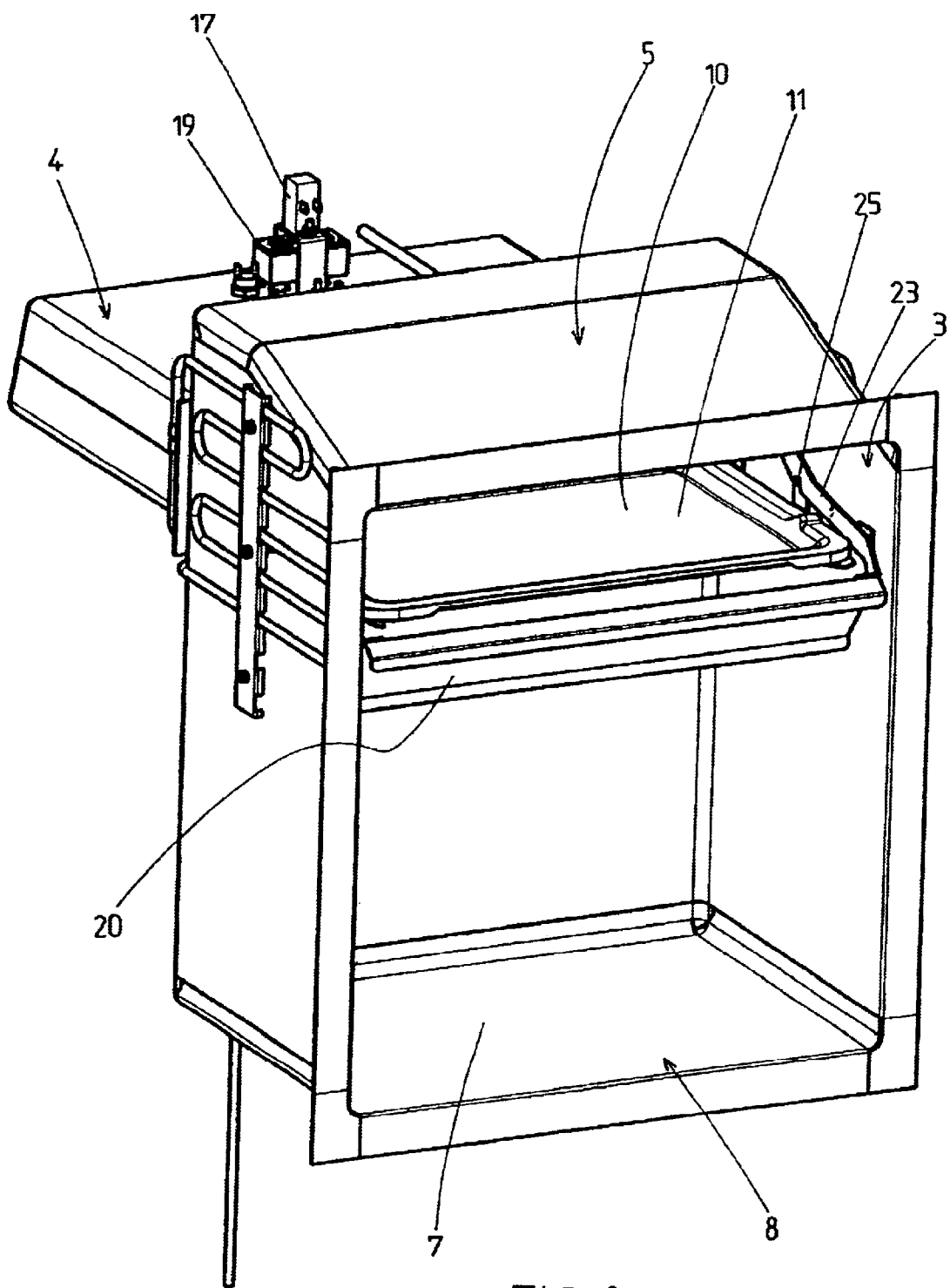
FIG. 3 is an overhead perspective exterior view of the FIG. 2 portions of the device, with the flaps open.
Figure 4:
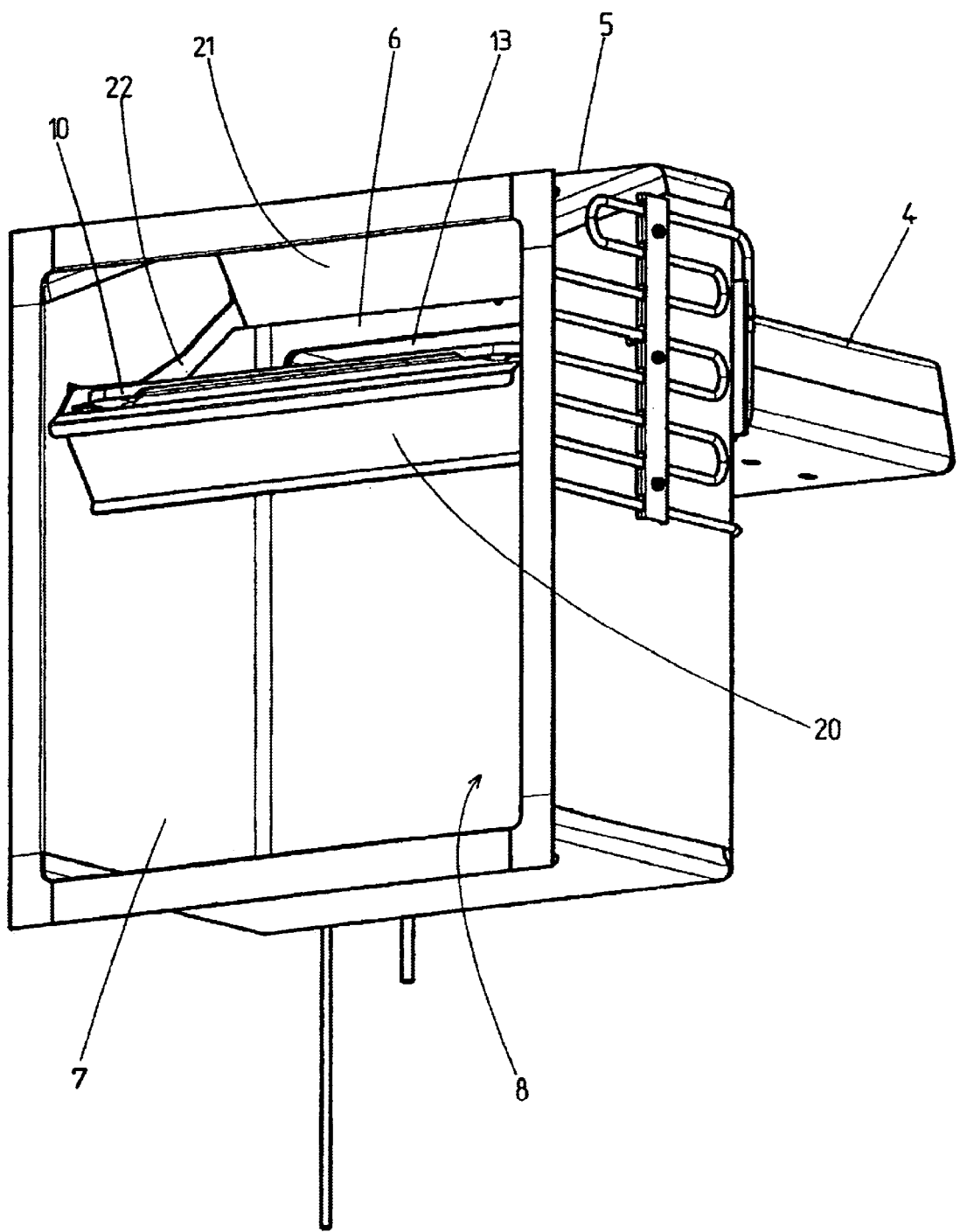
FIG. 4 is an underneath perspective view of the FIG. 3 device when open.
Figure 5:
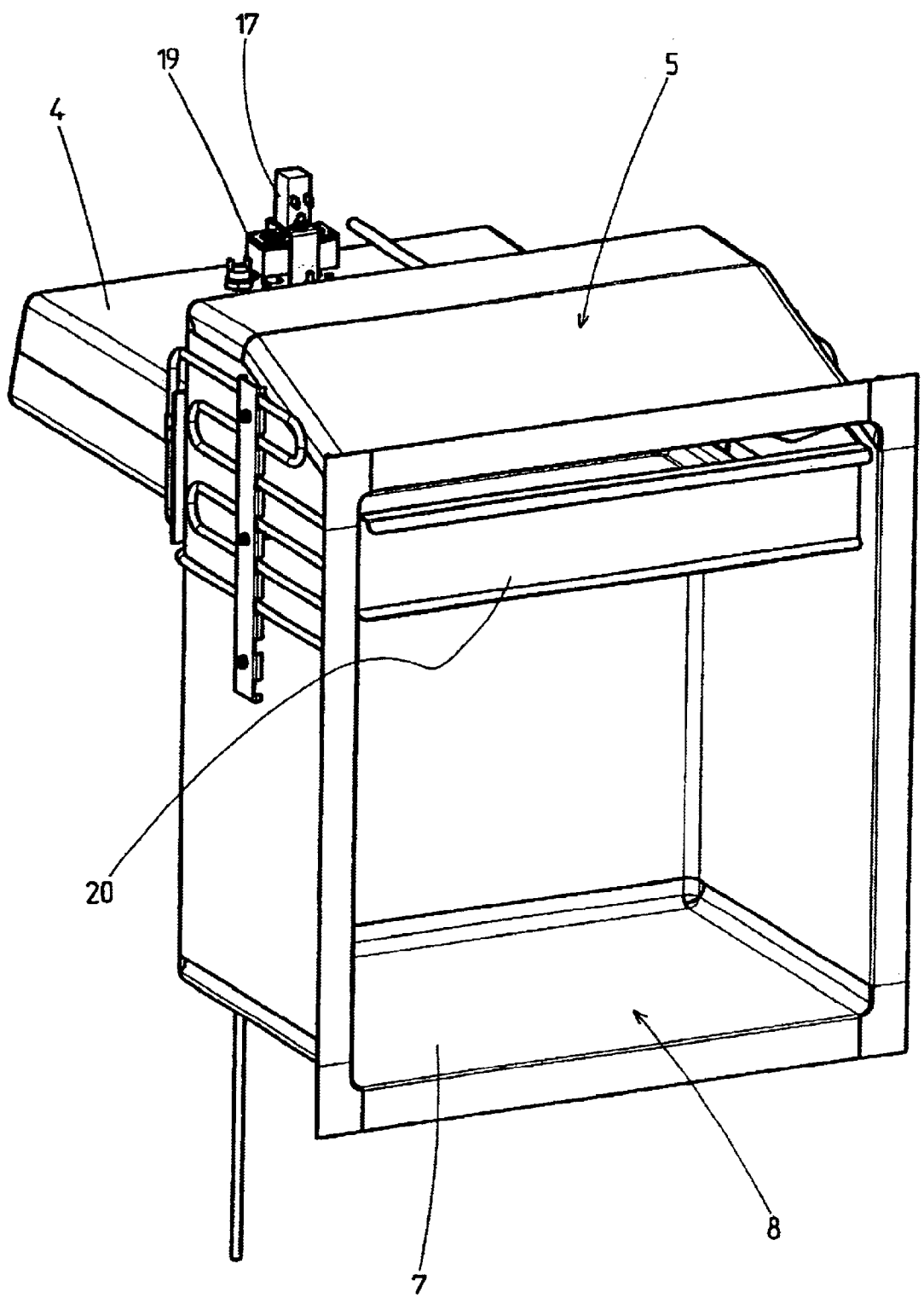
FIG. 5 is a view similar to FIG. 3, showing the interior portions of the device when closed.

According to the invention, the device includes a front closure flap 20 and an intermediate closure flap 21, which are mechanically coupled together and move between a closed position shown in FIG. 5 and an open position shown in FIGS. 2 to 4.

In the closed position shown in FIG. 5, the front closure flap 20 closes the front passage 3, and the intermediate closure flap 21 (see FIG. 2) closes the intermediate passage 6 above the meal tray 10, thus providing thermal insulation between the rear compartment 4 and the front compartment 5.

In the open position shown in FIG. 2, the front closure flap 20 and the intermediate closure flap 21 are retracted to allow the meal tray 10, the foods on it and the cloche 13 to move back and forth.

Figure 6:
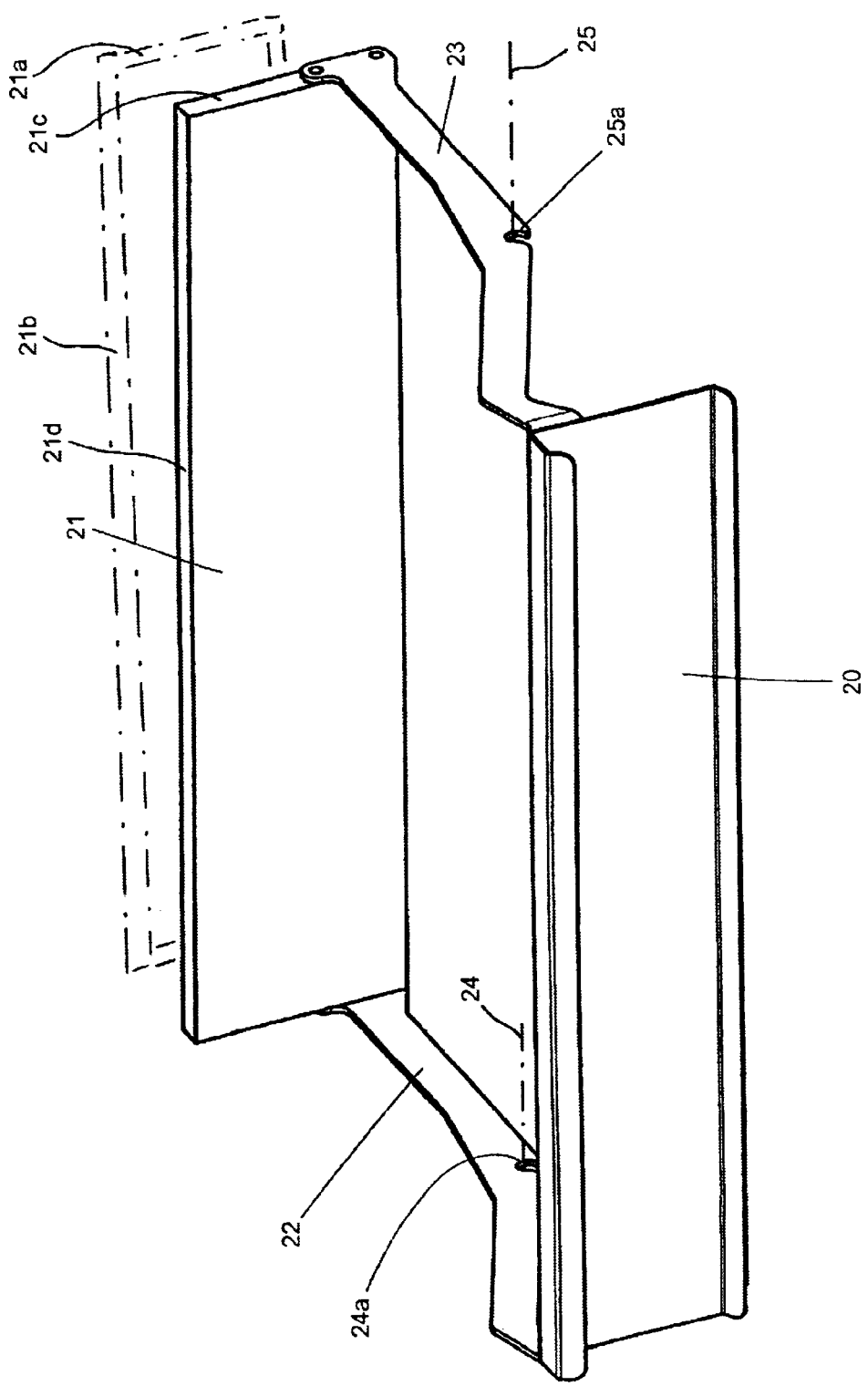
FIG. 6 is a perspective view showing the flaps coupled together and forming a rigid assembly with the connecting arms.

As shown in FIG. 2, and in more detail in figure 6, the front closure flap 20 and the intermediate closure flap 21 are rigidly connected together by two longitudinal lateral arms 22 and 23 that rotate about respective colinear transverse pivots 24 and 25. The two closure flaps 20 and 21 and the two longitudinal lateral arms 22 and 23 together form a rigid tilting assembly that pivots between closed and open positions.

In FIG. 2, the longitudinal lateral arms 22 and 23 each have a hole in which is engaged a respective pivot 24 or 25 fastened to the frame of the device. In this embodiment, demounting of the rigid tilting assembly comprising the two longitudinal lateral arms 22 and 23 and the two closure flaps 20 and 21 requires the pivots 24 and 25 to be removed first.

In an advantageous embodiment, shown in FIG. 6 in particular, and also in FIG. 3, the rigid tilting assembly is made easily demountable for cleaning. To this end, it rotates on fixed horizontal pegs, which are fastened to the frame of the device, and engage vertically in two notches 24a and 25a in the bottom edge of the longitudinal lateral arms 22 and 23. The rigid tilting assembly can therefore be easily demounted by raising it vertically to move the notches 24a and 25a away from the pegs constituting the pivots, and then moving the rigid tilting assembly horizontally in translation toward the front to take it out of the device. After cleaning, it is easy to re-engage the rigid tilting assembly by moving it in horizontal translation toward the back of the device, and then engaging the notches 24a and 25a over the pegs.

For compatibility with the facility to demount and remount the rigid tilting assembly, a seal can advantageously be provided by elastic tongues, for example elastomer tongues, which bear and slide on a conformed contact surface. For example, the lateral edges of the flap 21 can advantageously be arcuate and centered on the pivot 24 or 25, and curved elastic tongues fastened to the frame can bear frontally on the lateral edges of the flap 21. Similarly, the transverse edges of the flap 21 are straight, and straight transverse elastic tongues fastened to the frame can bear frontally on the transverse edges of the flap 21 when it is closed. FIG. 6 shows diagrammatically an elastic tongue 21*a* bearing frontally on a rear area of a lateral edge 21*c* of the flap 21 and an upper elastic tongue 21*b* bearing frontally on a rear portion of an upper transverse edge 21*d* of the flap 21.

A latch 26 can advantageously be provided (see FIG. 2), for example above the cloche 13 and cooperating with the intermediate closure flap 21. The latch selectively locks the tilting assembly 20–23 in the closed position while the device is heating.

As shown in FIG. 2, in this embodiment, when the device is open, the front closure flap 20 is lowered to a position under the front passage 3, whereas the intermediate closure flap 21 is raised to a position above the intermediate passage 6.

The device operates as follows: when distributing meal trays 10, the user opens the front door 9, then lowers the front closure flap 20, which simultaneously raises the intermediate closure flap 21. The user can then insert a meal tray 10 into the interior space 2 for receiving the tray, with the cloche 13 in the rear compartment 4 and the front portion 11 of the tray in the front compartment 5. The rear compartment 4 is shaped to contain all of the rear portion 12 of the meal tray 10 with the cloche 13, whereas the front compartment 5 is shaped to contain all of the front portion 11 of the meal tray 10.

The user can then close the flaps by returning the front closure flap 20 to the closed position shown in FIG. 5. The user can also close the front door 9. The device is then adapted to maintain a low storage temperature for the meal tray 10 and the foods on it.

The power supply means are caused manually or automatically to supply power to the electrical heating elements contained in the cloche 13, which heat the heating space 14 and the foods that it contains. During this time, the cooling device continues to cool the foods intended to be eaten cold in the complementary interior space 7.

After heating, the user can lower the front closure flap 20, which is unlatched, and take out the meal tray 10.

The present invention is not limited to the embodiments explicitly described, but includes variants and generalizations thereof within the scope of the following claims.

What is claimed is:

1. A device for storing and heating foods on a meal tray, the device comprising:

an insulated enclosure having an interior space for receiving a tray accessible via a front passage and divided into a rear compartment and a front compartment that communicate with each other via an intermediate passage, a cooling device adapted to maintain an appropriate storage temperature in the interior space in the insulated enclosure for receiving a tray, a heating device adapted to generate a heat energy in a heating space in the front compartment or the rear compartment, a front closure flap and an intermediate closure flap, that are mechanically coupled together to move between (i) a closed position in which the front closure flap the front passage and the intermediate closure flap closes the intermediate passage above the meal tray to provide thermal insulation, and (ii) an open position in which the front closure flap and intermediate closure flap are retracted to allow the meal tray and the foods on it to move back and forth, wherein the front closure flap and the intermediate closure flap are rigidly connected together by two longitudinal lateral arms that are mounted in the interior space for receiving a tray on two colinear transverse pivots, the two flaps and the two arms together forming a rigid assenbly that tilts between an open position and a closed position.

2. A device according to claim 1, wherein a seal is provided at the perimeter of the intermediate closure flap by elastic tongues.

3. A device according to claim 1, wherein the pivots are horizontal pegs adapted to engage removably in vertical notches.

4. A device according to claim 1, wherein the heating space is in the rear compartment.

5. A device according to claim 1, wherein the heating space is between a rear portion of the meal tray and a cloche that is placed on it to close said heating space.

6. A device according to claim 5, wherein it includes electrical power supply means adapted to supply electrical power to one or more electrical heating elements in the heating space.

7. A device according to claim 6, wherein the electrical heating element(s) are incorporated in the wall of the cloche.

8. A device according to claim 7, wherein the cloche is removable and is carried by the meal tray.

9. A device according to claim 1, further including a complementary interior space, that is under the interior space for receiving a tray, accessible via an open front side, cooled by the cooling device with a front door for selectively closing said open front side and the front passage in front of the front closure flap.

10. A device according to claim 1, further including a latch adapted to lock the tilting assembly in the closed position when the device is heating.

* * * * *

UNITED STATES PATENT AND TRADEMARK OFFICE
CERTIFICATE OF CORRECTION

PATENT NO. : 6,745,675 B2  
DATED : June 8, 2004  
INVENTOR(S) : Richard et al.

It is certified that error appears in the above-identified patent and that said Letters Patent is hereby corrected as shown below:

Column 6,
Line 14, insert -- closes -- after "flap"

Signed and Sealed this

Thirtieth Day of November, 2004

JON W. DUDAS
*Director of the United States Patent and Trademark Office*